United States Patent
Aaron (10) Patent No.: US 7,324,986 B2
(45) Date of Patent: Jan. 29, 2008

(54) AUTOMATICALLY FACILITATED SUPPORT FOR COMPLEX ELECTRONIC SERVICES

(75) Inventor: Jeffrey A. Aaron, Atlanta, GA (US)

(73) Assignee: AT&T Delaware Intellectual Property, Inc., Wilmington, DE (US)

(*) Notice: Subject to any disclaimer, the term of this patent is extended or adjusted under 35 U.S.C. 154(b) by 486 days.

(21) Appl. No.: 10/610,807

(22) Filed: Jun. 30, 2003

(65) Prior Publication Data

US 2004/0267750 A1 Dec. 30, 2004

(51) Int. Cl.
G06F 7/00 (2006.01)
G06F 17/30 (2006.01)

(52) U.S. Cl. .............................. 707/3; 707/5
(58) Field of Classification Search ................. 707/5, 707/3
See application file for complete search history.

(56) References Cited

U.S. PATENT DOCUMENTS

| | | | |
|---|---|---|---|
| 4,888,771 A | 12/1989 | Benignus et al. ............. 714/26 |
| 4,967,337 A | 10/1990 | English et al. ................ 700/79 |
| 4,985,857 A | 1/1991 | Bajpai et al. ................ 702/184 |
| 5,243,689 A * | 9/1993 | Yoshiura et al. ............. 706/12 |
| 5,267,351 A * | 11/1993 | Reber et al. ............. 707/104.1 |
| 5,388,259 A * | 2/1995 | Fleischman et al. ........... 707/5 |
| 5,408,412 A | 4/1995 | Hogg et al. ................... 701/33 |
| 5,444,823 A * | 8/1995 | Nguyen ....................... 706/54 |
| 5,491,791 A | 2/1996 | Glowny et al. ............... 714/37 |
| 5,640,403 A | 6/1997 | Ishiyama et al. ........... 714/737 |
| 5,696,701 A | 12/1997 | Burgess et al. ............... 714/25 |
| 5,704,036 A | 12/1997 | Brownmiller et al. ........ 714/43 |
| 5,715,374 A * | 2/1998 | Heckerman et al. .......... 706/46 |
| 5,717,835 A * | 2/1998 | Hellerstein .................... 706/46 |
| 5,794,237 A * | 8/1998 | Gore, Jr. ......................... 707/5 |
| 5,822,743 A * | 10/1998 | Gupta et al. .................. 706/50 |
| 5,862,325 A * | 1/1999 | Reed et al. .................. 709/201 |
| 5,951,611 A | 9/1999 | La Pierre ...................... 701/29 |
| 5,968,195 A | 10/1999 | Ishiyama ..................... 714/727 |
| 5,977,964 A | 11/1999 | Williams et al. ............. 715/721 |
| 6,026,388 A * | 2/2000 | Liddy et al. .................... 707/1 |
| 6,026,393 A * | 2/2000 | Gupta et al. .................... 707/3 |
| 6,052,809 A | 4/2000 | Bowden ..................... 714/738 |
| 6,073,170 A * | 6/2000 | Sumita et al. ............... 709/218 |
| 6,098,061 A * | 8/2000 | Gotoh et al. ................. 706/50 |
| 6,125,458 A | 9/2000 | Devan et al. ................. 714/43 |
| 6,128,753 A | 10/2000 | Keeble et al. ................ 714/25 |
| 6,131,085 A * | 10/2000 | Rossides ......................... 705/1 |

(Continued)

OTHER PUBLICATIONS

Sah, Adam, "A New Architecture for Managing Enterprise Log Data" Oct. 2002, USENIX LISA 2002 16th Systems Administration Conference, pp. 1-8, 17-26 (blank pages removed), p. 5, Jun. 13, 2006.*

(Continued)

Primary Examiner—Apu Mofiz
Assistant Examiner—Brent S Stace
(74) Attorney, Agent, or Firm—Hope Baldauff Hartman, LLC (57) ABSTRACT

Systems for an automatically facilitated support for complex electronic services include a plurality of databases having customer records and problem solving information to assist a user with problem resolution and a cycler module configured to access the databases. The cycler module is further configured to search the databases for database pages having keywords that match input provided by the user. Other systems and methods are also provided.

31 Claims, 8 Drawing Sheets

U.S. PATENT DOCUMENTS

| | | | |
|---|---|---|---|
| 6,195,773 B1 | 2/2001 | Wada | 714/724 |
| 6,236,989 B1 * | 5/2001 | Mandyam et al. | 707/4 |
| 6,249,784 B1 * | 6/2001 | Macke et al. | 707/3 |
| 6,266,774 B1 * | 7/2001 | Sampath et al. | 726/24 |
| 6,321,192 B1 * | 11/2001 | Houchin et al. | 704/9 |
| 6,326,962 B1 * | 12/2001 | Szabo | 715/762 |
| 6,415,395 B1 | 7/2002 | Varma et al. | 714/37 |
| 6,430,558 B1 * | 8/2002 | Delano | 707/5 |
| 6,539,387 B1 * | 3/2003 | Oren et al. | 707/100 |
| 6,571,236 B1 * | 5/2003 | Ruppelt | 707/3 |
| 6,587,847 B1 * | 7/2003 | Stier et al. | 706/50 |
| 6,708,291 B1 | 3/2004 | Kidder | 714/39 |
| 6,738,780 B2 | 5/2004 | Lawrence et al. | 707/101 |
| 6,738,933 B2 | 5/2004 | Fraenkel et al. | 714/47 |
| 6,754,885 B1 * | 6/2004 | Dardinski et al. | 717/113 |
| 6,820,082 B1 | 11/2004 | Cook et al. | 707/9 |
| 6,862,710 B1 * | 3/2005 | Marchisio | 715/501.1 |
| 6,883,120 B1 | 4/2005 | Banga | 714/47 |
| 7,058,822 B2 * | 6/2006 | Edery et al. | 726/22 |
| 7,058,861 B1 | 6/2006 | Adams | 714/47 |
| 7,076,695 B2 | 7/2006 | McGee et al. | 714/47 |
| 7,080,000 B1 * | 7/2006 | Cambridge | 703/21 |
| 7,133,866 B2 * | 11/2006 | Rishel et al. | 707/3 |
| 7,237,266 B2 | 6/2007 | Aaron | 726/25 |
| 7,246,265 B2 | 7/2007 | Vollmar et al. | 714/26 |
| 7,257,744 B2 | 8/2007 | Sabet et al. | 714/56 |
| 2002/0078403 A1 | 6/2002 | Gullo et al. | 714/37 |
| 2002/0087408 A1 | 7/2002 | Burnett | 705/14 |
| 2002/0091671 A1 * | 7/2002 | Prokoph | 707/1 |
| 2002/0169771 A1 * | 11/2002 | Melmon et al. | 707/5 |
| 2002/0180795 A1 * | 12/2002 | Wright | 345/772 |
| 2003/0065986 A1 | 4/2003 | Fraenkel et al. | 714/47 |
| 2003/0233438 A1 | 12/2003 | Hutchinson et al. | 709/223 |
| 2004/0073855 A1 | 4/2004 | Maxwell | 714/724 |
| 2004/0103309 A1 | 5/2004 | Tracy et al. | 726/25 |
| 2004/0107405 A1 * | 6/2004 | Schein | 715/530 |
| 2004/0193907 A1 | 9/2004 | Patanella | 726/25 |
| 2004/0225927 A1 | 11/2004 | Warpenburg et al. | 714/47 |
| 2004/0250122 A1 | 12/2004 | Newton | 726/2 |
| 2005/0015667 A1 | 1/2005 | Aaron | 714/25 |
| 2005/0038697 A1 | 2/2005 | Aaron | 705/14 |
| 2005/0210331 A1 | 9/2005 | Connelly et al. | 714/26 |
| 2006/0248389 A1 | 11/2006 | Thaler et al. | 714/26 |
| 2007/0038899 A1 | 2/2007 | O'Brien et al. | 714/47 |

OTHER PUBLICATIONS

U.S. Official Action dated Oct. 3, 2007 in U.S. Appl. No. 10/611,630.
U.S. Official Action dated May 17, 2007 in U.S. Appl. No. 10/611,630.
U.S. Official Action dated Dec. 5, 2006 in U.S. Appl. No. 10/611,630.
U.S. Official Action dated Jun. 1, 2006 in U.S. Appl. No. 10/611,630.
U.S. Official Action dated Dec. 15, 2005 in U.S. Appl. No. 10/611,630.
Notice of Allowance and Allowability dated Apr. 5, 2007 in U.S. Appl. No. 10/611,637.
U.S. Official Action dated Aug. 24, 2006 in U.S. Appl. No. 10/611,637.
U.S. Official Action dated Mar. 29, 2006 in U.S. Appl. No. 10/611,637.
U.S. Official Action dated Dec. 21, 2005 in U.S. Appl. No. 10/611,637.
U.S. Appl. No. 11/768,055, entitled "Electronic Vulnerability and Reliability Assessment," filed on Jun. 25, 2007.
U.S. Official Action dated Sep. 10, 2007 in U.S. Appl. No. 10/611,634.
U.S. Official Action dated Mar. 29, 2007 in U.S. Appl. No. 10/611,634.
U.S. Official Action dated Sep. 20, 2006 in U.S. Appl. No. 10/611,634.
U.S. Official Action dated Mar. 29, 2006 in U.S. Appl. No. 10/611,634.

* cited by examiner

AUTOMATICALLY FACILITATED SUPPORT FOR COMPLEX ELECTRONIC SERVICES

TECHNICAL FIELD

The present invention is generally related to computer systems and, more particularly, is related to providing assistance for resolving computer related problems.

BACKGROUND OF THE INVENTION

Electronic security services such as anti-virus protection, hacker intrusion detection, electronic privacy protection, and firewalls are often technically complicated and difficult for customers to understand. Due to this complexity, the ability of users or customers to troubleshoot or obtain needed support for such services is impaired. One reason for the difficulties is that it is difficult for customer service representatives to quickly identify the key issues involved, explain solutions in a concise and simple manner, and relate the solutions to activities or needs with which the customer is familiar. In addition, due to the costs of providing satisfactory training to support personnel, many service providers attempt to minimize the costs of customer support rather than expand support.

Thus, heretofore-unaddressed needs exist for a solution that addresses the aforementioned and other deficiencies and inadequacies.

SUMMARY OF THE INVENTION

Preferred embodiments of the present invention provide a system and method for automatically facilitated support for complex electronic services.

Briefly described, in architecture, one embodiment of the system, among others, can be implemented to include an index database, configured to include user records and a deep database structure configured to include a plurality of database pages preferably organized in a hierarchical manner and including symptoms and associated keywords. A cycler module is configured to access a plurality of databases having customer records and problem solving information to assist in resolving user's problems encountered with their electronic services by searching the databases for database pages having keywords that match input provided by the user.

One preferred embodiment of the present invention can also be viewed as providing methods for the automatic facilitation of customer support for complex electronic security services. In this regard, one embodiment of such a method, among others, can be broadly summarized by the following steps: detecting a receipt of input of key words associated with a particular symptom; accessing an index database in to obtain a user's records; accessing a deep database structure configured as hierarchical database pages, each database page including information such as a list of symptoms and associated keywords; and cycling through the database structure to obtain a database page having a match between the user input and information contained in the database structure.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Disclosed herein are systems and methods for automatically facilitated support for complex electronic services. To facilitate description an example system that can be used to implement automatically facilitated customer support is discussed with reference to the figures. Although this system is described in detail, it will be appreciated that this system is provided for purposes of illustration only and that various modifications are feasible without departing from the inventive concept. After the example system has been described, an example of operation of the system will be provided to explain the manner in which the system can be used to provide for automatically facilitated customer support.

Figure 1:
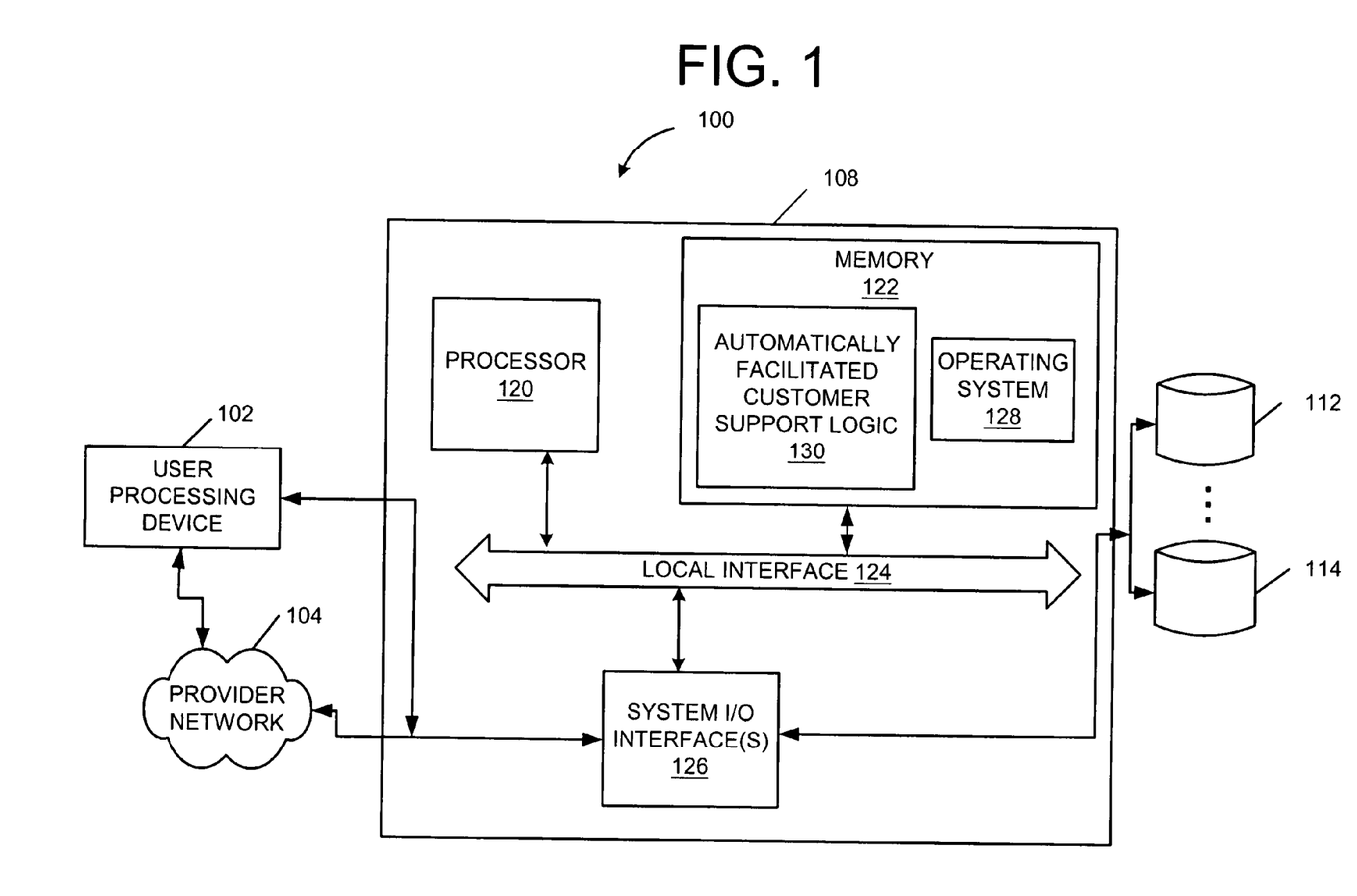
FIG. 1 is a block diagram depicting a preferred embodiment of a system for automatically facilitated customer support.

Referring now in more detail to the drawings, in which like numerals indicate corresponding parts throughout the several views, FIG. 1 is a block diagram depicting a preferred embodiment of a system 100 for automatically facilitated customer support. The system 100 includes a user processing device 102, a provider network 104, a computing device 108 that depicts an illustrative example of an implementation of automatically facilitated customer support that includes logic configured to provide for automatically facilitated customer support, and data that includes customer specific information and information for responding to customer/user requests. In an example, the information for responding to customer/user requests includes data such as applications, systems, recommendations, security information, explanatory material, among others. Preferably, any such information is stored in databases 112, 114 and in one embodiment, organized as field, records, or files, etc. In a preferred embodiment, the databases 112, 114 are accessible to the digital computer 108 via the a system I/O interface 126. In an alternative preferred embodiment, the digital computer 108 is configured to include the databases 112, 114 in memory. In yet another preferred embodiment, the databases reside on a storage server accessible by the digital computer 108.

The provider network 104 may be any type of communications network employing any network topology, transmission medium, or network protocol. For example, such a network may be any public or private packet-switched or other data network, including the Internet, circuit-switched network, such as a public switch telecommunications network (PSTN), wireless network, or any other desired communications infrastructure and/or combination of infrastructure. Alternatively, the user could interact directly with the computing device 108 instead of via the provider network 104 and the user processing device 102.

Generally, in terms of hardware architecture, as shown in FIG. 1, the digital computer 108 includes, inter alia, a processor 120 and memory 122. Input and/or output (I/O) devices (or peripherals) can be communicatively coupled to a local interface 124 via a system I/O interface 126, or directly connected to the local interface 124. The local interface 124 can be, for example but not limited to, one or more buses or other wired or wireless connections, as is known in the art. The local interface 124 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 120 is a hardware device for executing software, particularly that stored in memory 122. The processor 120 can be any custom made or commercially available processor, a central processing unit (CPU), an auxiliary processor among several processors, a semiconductor based microprocessor (in the form of a microchip or chip set), a macroprocessor, or generally any device for executing software instructions.

The memory 122 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 122 may incorporate electronic, magnetic, optical, and/or other types of storage media. Note that the memory 122 can have a distributed architecture, where various components are situated remote from one another, but can be accessed by the processor 120.

The software and/or firmware in memory 122 may include one or more separate programs, each of which comprises an ordered listing of executable instructions for implementing logical functions. In the example of FIG. 1, the software in the memory 122 can include automatically facilitated customer support logic 130 (such as an access filtering parser, database interface module, and presentation module logic), and a suitable operating system (O/S) 128. The operating system essentially controls the execution of other computer programs, and provides scheduling, input-output control, file and data management, memory management, and communication control and related services.

The logic 130 is a source program, executable program (object code), script, or any other entity comprising a set of instructions to be performed. When the logic 130 is implemented as a source program, then the program needs to be translated via a compiler, assembler, interpreter, or the like, which may or may not be included within the memory 122, so as to operate properly in connection with the O/S. Furthermore, logic 130 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices may include input devices, for example but not limited to, a keyboard, mouse, scanner, microphone, etc. Furthermore, the I/O devices may also include output devices, for example but not limited to, a printer, display, etc. The I/O devices may further include devices that communicate both inputs and outputs, for instance but not limited to, a modulator/demodulator (modem; for accessing another device, system, or network), a radio frequency (RF) or other transceiver, a telephonic interface, a bridge, a router, etc. Finally, I/O 126 may couple to the provider network 104 that is configured to communicate with the user processing device 102.

When the logic 130 is implemented in software, as is shown in FIG. 1, it should be noted that logic 130 can be stored on any computer-readable medium for use by or in connection with any computer related system or method. The logic 130 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the logic 130 is implemented in hardware, the logic 130 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
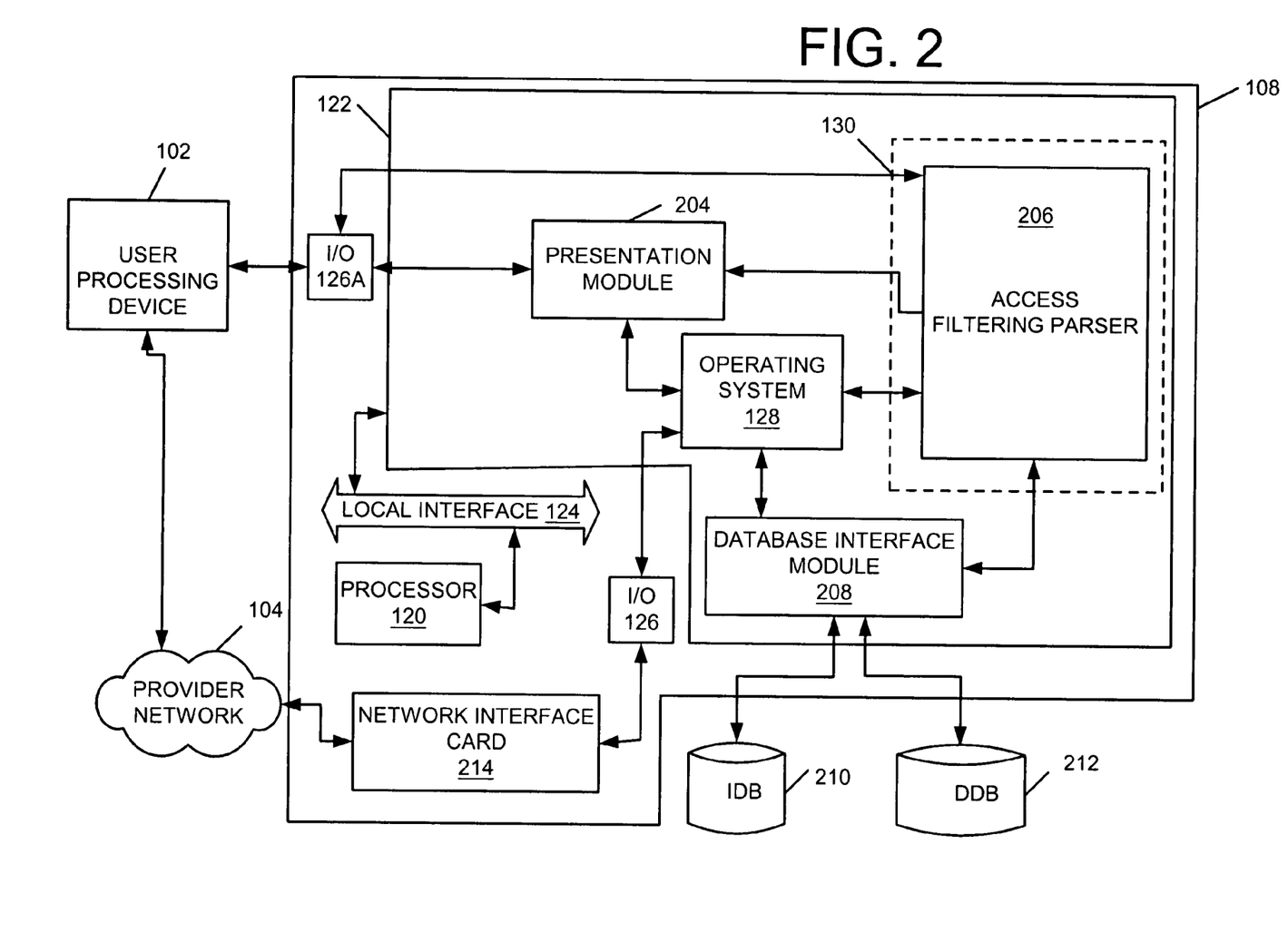
FIG. 2 is a block diagram depicting an illustrative example of a preferred embodiment of a system for providing automatically facilitated customer support.

FIG. 2 is a block diagram depicting a more detailed illustrative example of a preferred embodiment of a system for automatic facilitated customer support. The system includes the computing device 108 that communicates with the user processing device 102, provider network 104, databases 112, 114 configured as an index database (IDB)

210 and a deep database (DDB) 212. The computing device 108 further includes memory 122 having operating system 128, a presentation module 204, database interface module 208, and logic 130 configured as an access filtering parser 206. Further, the computing device 108 includes the local interface 124, processor 120, system interfaces 126, 126A, and a network interface card 214. In an example, the user processing device 102 communicates with the computing device 108 via the I/O 126A. In another preferred embodiment, the user processing device 102 communicates with the computing device 108 via the provider network 104. In a preferred embodiment, the network interface card 214, I/O 126, and database interface modules 208 are utilized for communicating between the provider network 104 and the databases 210, 212.

The access filtering parser module (AFP) 206 provides an interface and algorithmic intelligence between the user processing device 102 and the databases 210, 212. On the interface "front end" the AFP 206 employs two special mechanisms to facilitate the interaction of user support requests with the system. For example, a request can embody a user support request document that it includes the information needed, especially any information from common security mechanisms available on systems managed by the user, such as firewall logs and anti-virus logs or results, among others. These mechanisms may include a special transmit-to-provider feature/option to automatically send information to the AFP 206 when problems are encountered. In a preferred embodiment, input is parsed or interpreted in order to match lists of keywords to items usable as input. The AFP "back end" algorithms collect state information via information presented and questions presented, accumulating descriptive information relevant to the user support request as well as associated circumstances and conditions, thereby allowing progress deeper into the databases 210, 212. In one preferred embodiment, the user can thus delve deeper into the databases 210, 212 by providing additional details and responding to questions pulled from the databases 210, 212. The answer to a particular question, for instance, could cause the inquiry to branch or be focused in a different direction or alternatively might provide the information needed to exclude or include a possibility, which may need to be considered by the user.

The presentation module 204 summarizes and formats the accumulated results from a search in an appropriate manner to be informative to a user. In one preferred embodiment, the presentation module 204 utilizes software engineering to accomplish the presentation of accumulated results to the user. For example, application programming interfaces can be utilized that are consistent with the user's operating system such as Unix, Linux, Windows, etc., with specific configurations being dependent upon the particular implementation. In another preferred embodiment, the presentation module 204 includes functionality to eliminate repetitious information in the results stored from each cycle, for instance, by searching within the accumulated information for identical material and deleting subsequent occurrences so that the final results presented to the user do not exhibit any redundancies. Intermediate accumulated results (after the completion of each cycle) are presented to the user so that the user can provide additional input for the next cycle. In addition, the presentation module 204 queries the user at the beginning of each cycle so that the user becomes aware that the user is expected to either provide additional data or terminate the process when the accumulated results are satisfactory and the user does not desire any further or more in-depth information. When intermediate accumulated results are presented to the user, a portion of that information accessed from the DDB 212 as a result of the cycle just completed is composed of pertinent questions to ask the user at that point. The process provides for the user being asked appropriate questions and thus prompted for input at the end of each cycle. The user input becomes the appropriate keywords (for matching) during the next cycle preferably via the action of an input parser/filter module (shown in FIG. 3). In addition, the presentation module 204 provides keywords associated with any current prompting to the input parser/filter module so that user responses to that prompting can be associated with the pertinent keywords, and thus keywords can be provided as appropriate to a cycler module (shown in FIG. 3). In an alternative embodiment, where keywords are not actually extracted from the user, but rather the user answers a specific prompt with a yes or no, if the response is yes, then the keyword associated with that prompt is provided to the cycler module.

The database interface module 208 provides standard functionality utilizing, for instance, a structured query language to enable provisioning and access of the databases, IDB 210 and DDB 212. In an alternative preferred embodiment, an additional interface, such as a provisioning interface can be provided which allow for provisioning of the databases.

In a preferred embodiment, the DDB 212 is pre-provisioned such that modules of preferred embodiments of the invention can achieve the correct results. Preferably, data in the DDB 212 is arranged as a hierarchical structure of a plurality of database pages. The DDB 212 is preferably organized in a database structure of DDB pages 212 as a range of information or as a continuum into a set of discrete stages that conveniently allow for repeated input, via the sort of questions that an expert would typically ask at each stage.

For example, a top section of the DDB structure includes information necessary to answer broad or general questions and/or symptoms that would naturally occur with customer inquiries. An inquiry to a bottom section of the DDB 212 results in specific helpful information that (i) answers the inquiry and/or (ii) provides specific advice for remedial action. Intermediate sections of the DDB structure are preferably pre-provisioned with information and prompting questions that leads the user from a top DDB page to the desired bottom page(s), and allows for branching to related DDB pages as needed to identify all associated helpful information.

In an alternative preferred embodiment of the invention, hierarchical arrangements include broad-at-the-top to specific-at-the-bottom, that start with different types of broad information (at the top) and proceed to different types of specific information (at the bottom), and likewise would include intermediate stages (in the middle).

In a preferred embodiment, the IDB 210 includes customer records and any other pertinent customer information.

Figure 3:
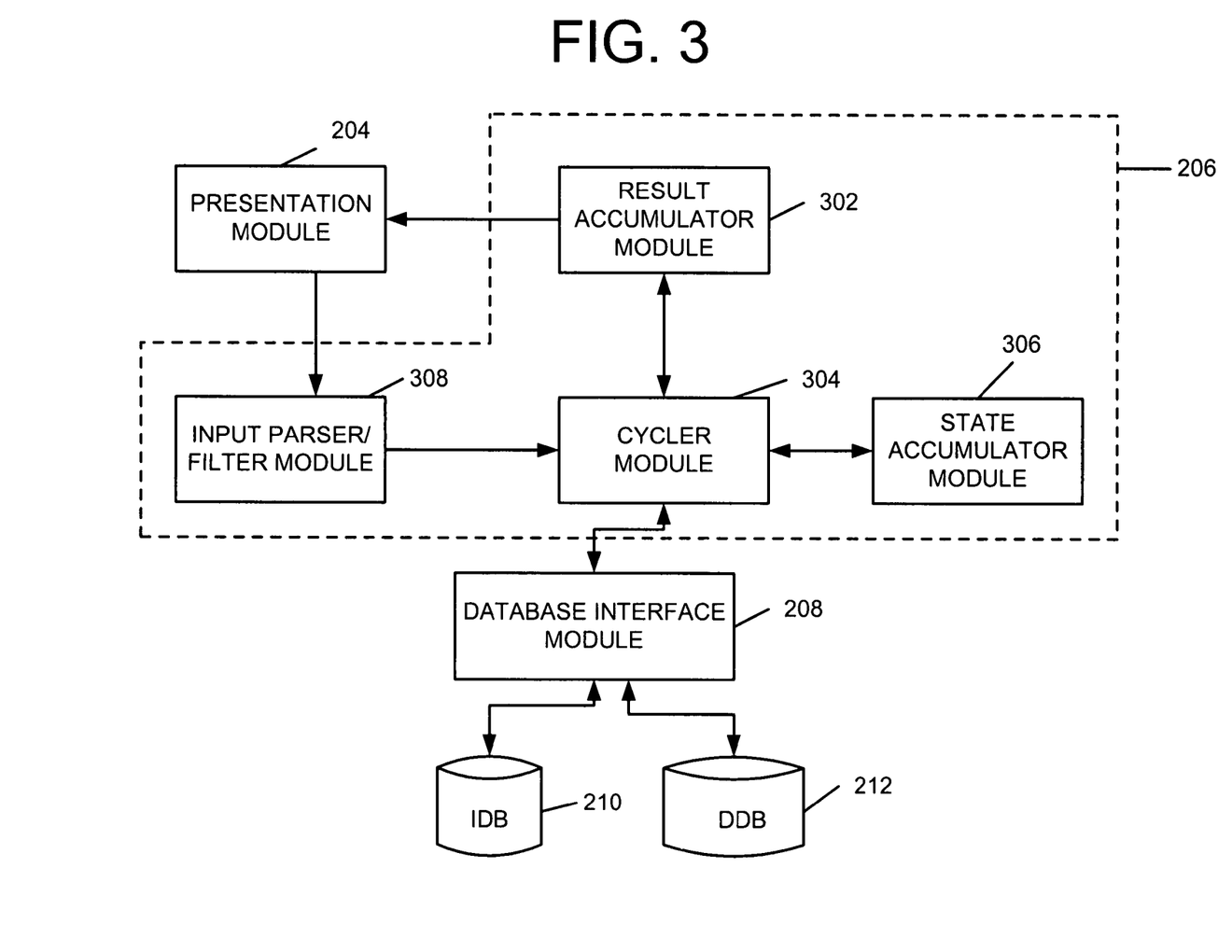
FIG. 3 is a block diagram of an illustrative example of a preferred embodiment of an access filtering parser of a system for automatically facilitated customer support.

FIG. 3 is a block diagram of an illustrative example of a preferred embodiment of an access filtering parser of a system for automatically facilitated customer support. In a preferred embodiment, the access filtering parser 206 includes a result accumulator module 302 that couples to the presentation module 204 and a cycler module 304, a state accumulator module 306 coupled to the cycler module 304, and an input parser/filter module 308 coupled to the cycler module 304, presentation module 204 which couples indirectly to the user processing device 102 via the presentation module 204.

The input parser/filter module 308 receives input from the user's processing device 102 in a plurality of formats, such as email, web form, automatically generated files, for example, firewall or intrusion detection system logs, electronic interactive form input filled out by a customer representative talking to a customer, or input in response to prompting from a presentation module, among others. The input parser/filter module 308 converts the input to data usable by the cycler module 304. In one preferred embodiment, the input parser/filter module 308 utilizes standard software engineer techniques to convert the input into usable data. The input parser/filter module 308 preferably interacts with the user's processing device 102 via application programming interfaces that are consistent with the user's operating system, for instance, Unix, Linux, windows, etc., with the details of the interfaces being dependent upon the specific implementation including the choice of software language and design. In a preferred embodiment, the implementation is selected to perform the specific conversions needed for each allowed input type. During the conversion process, the input parser/filter module 308 filters out extraneous data, such that only pertinent input remains. Further, the input parser/filter module 308 receives keyword information from the presentation module 204 regarding any current prompting provided to the user so that user responses to that prompting can be associated with those pertinent keywords.

Figure 4:
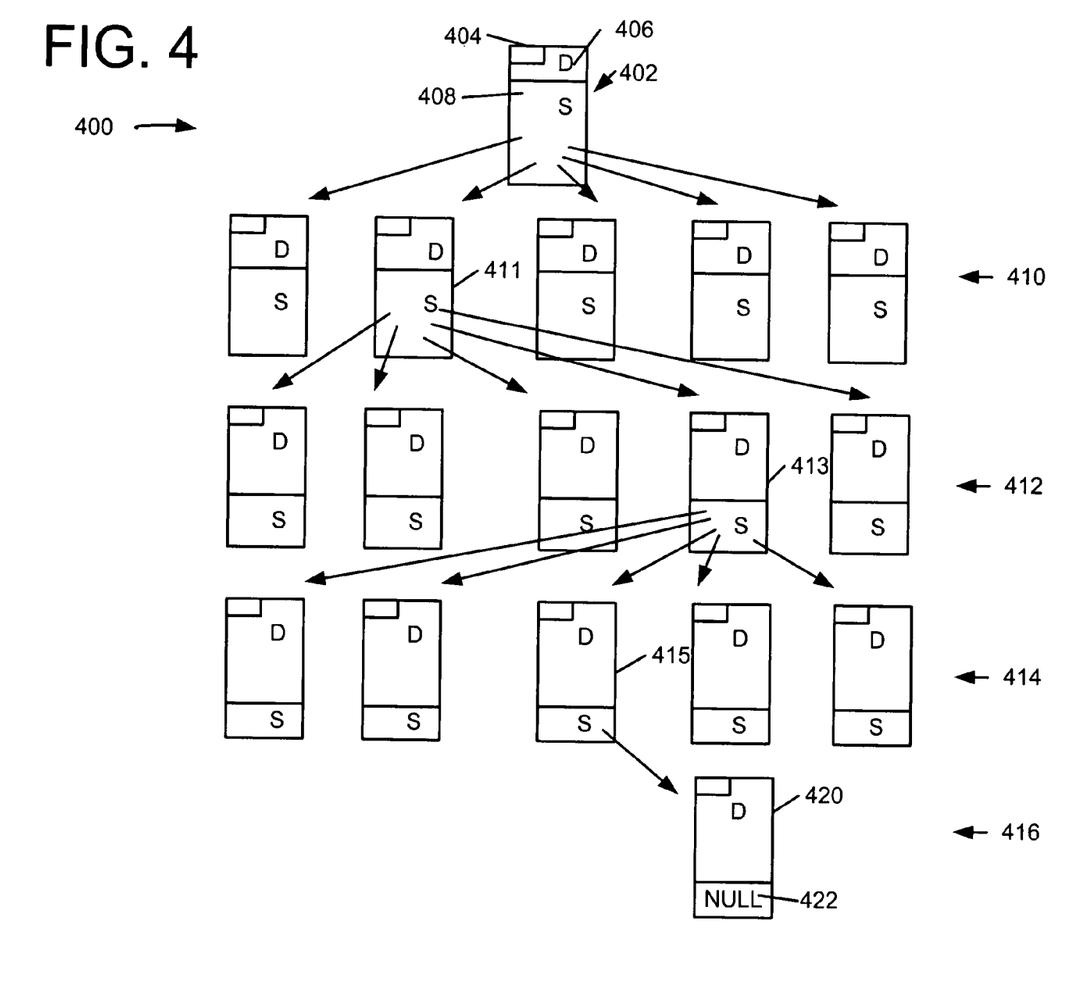
FIG. 4 is a block diagram of an illustrative example of a preferred embodiment of a deep database structure of a system for automatically facilitated customer support.
Figure 5:
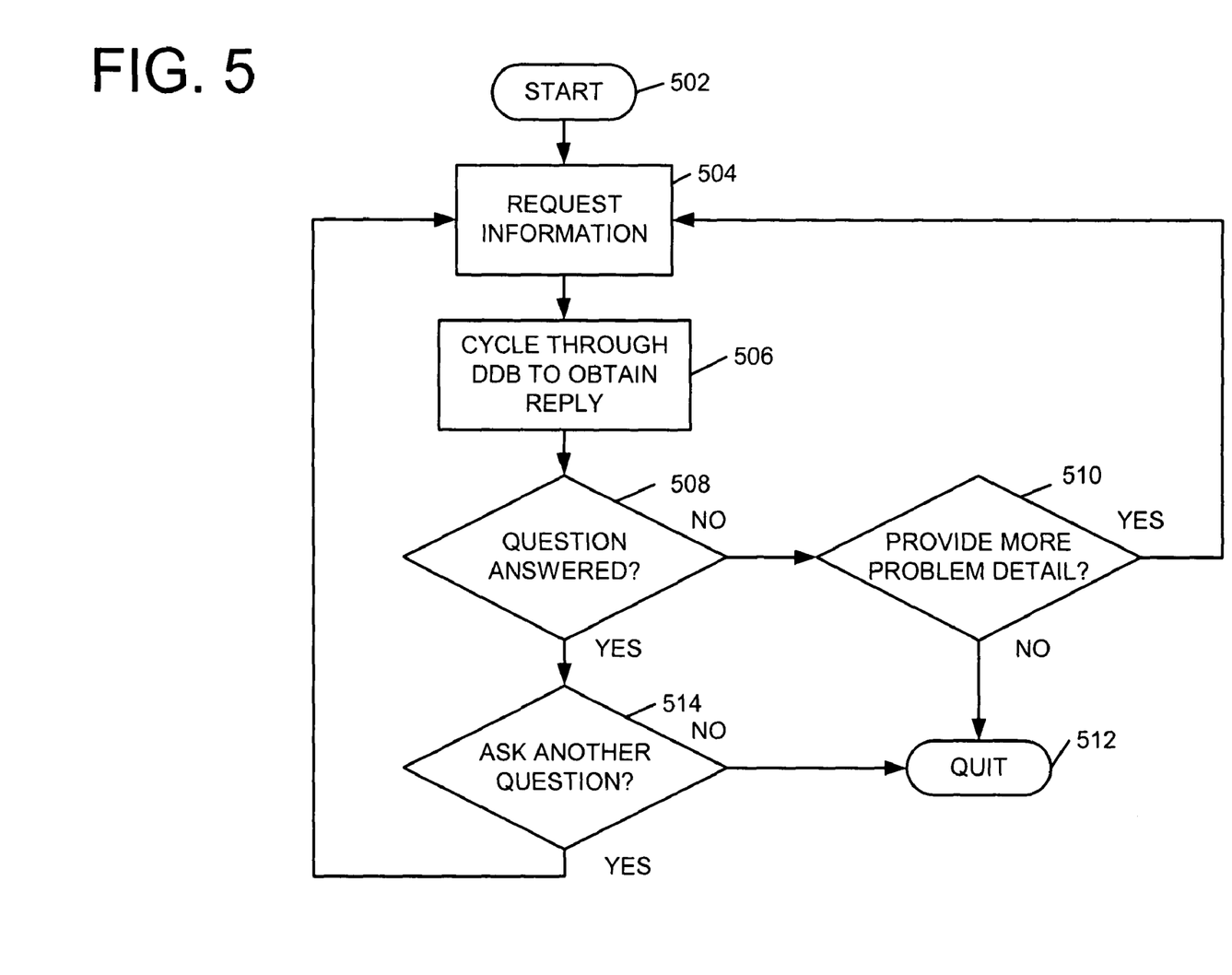
FIG. 5 is a flowchart depicting functionality, in accordance with one preferred embodiment, of an implementation of automatically facilitated customer support.
Figure 6A:
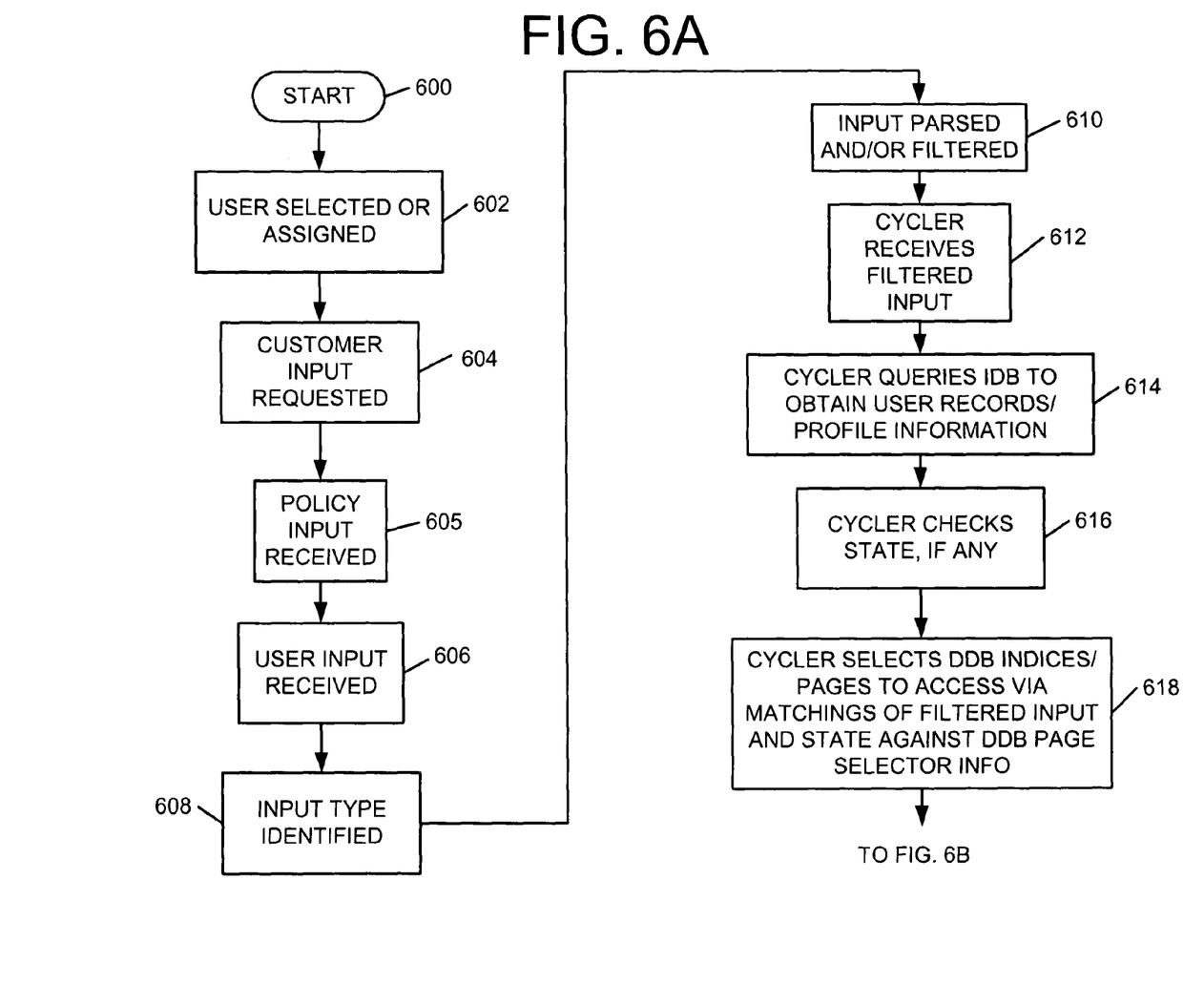
FIGS. 6A and 6B are flowcharts depicting more specific functionality, in accordance with one preferred embodiment, of an implementation of automatically facilitated customer support.
Figure 6B:
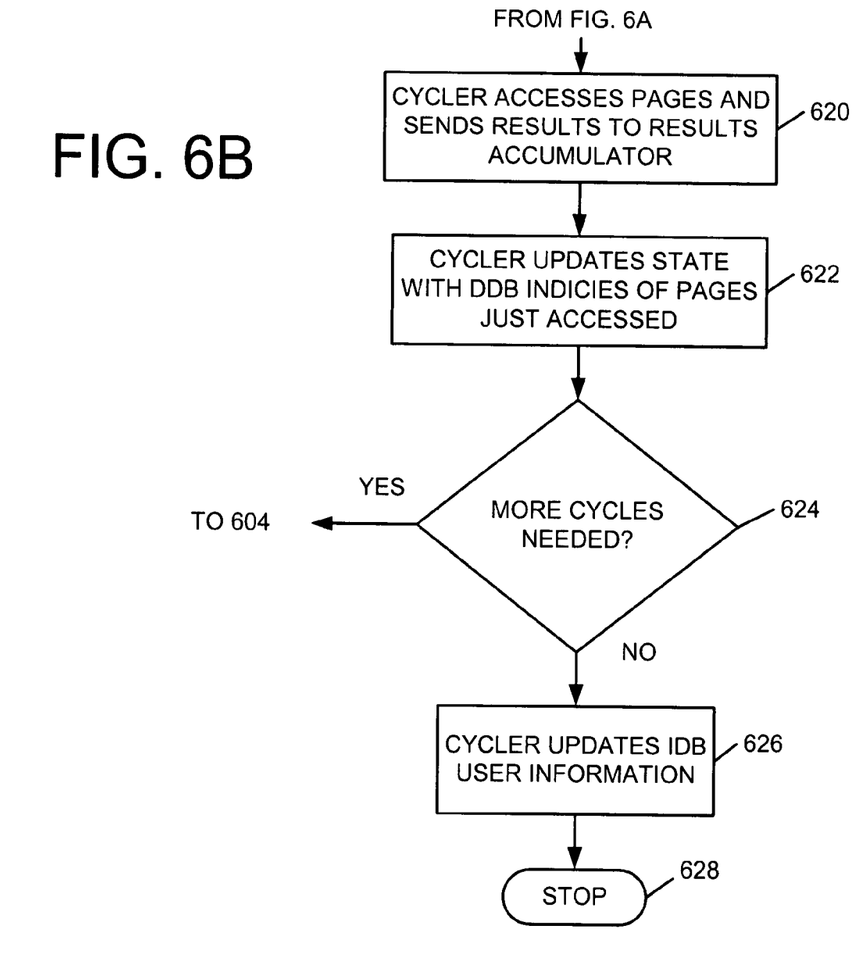
Figure 7:
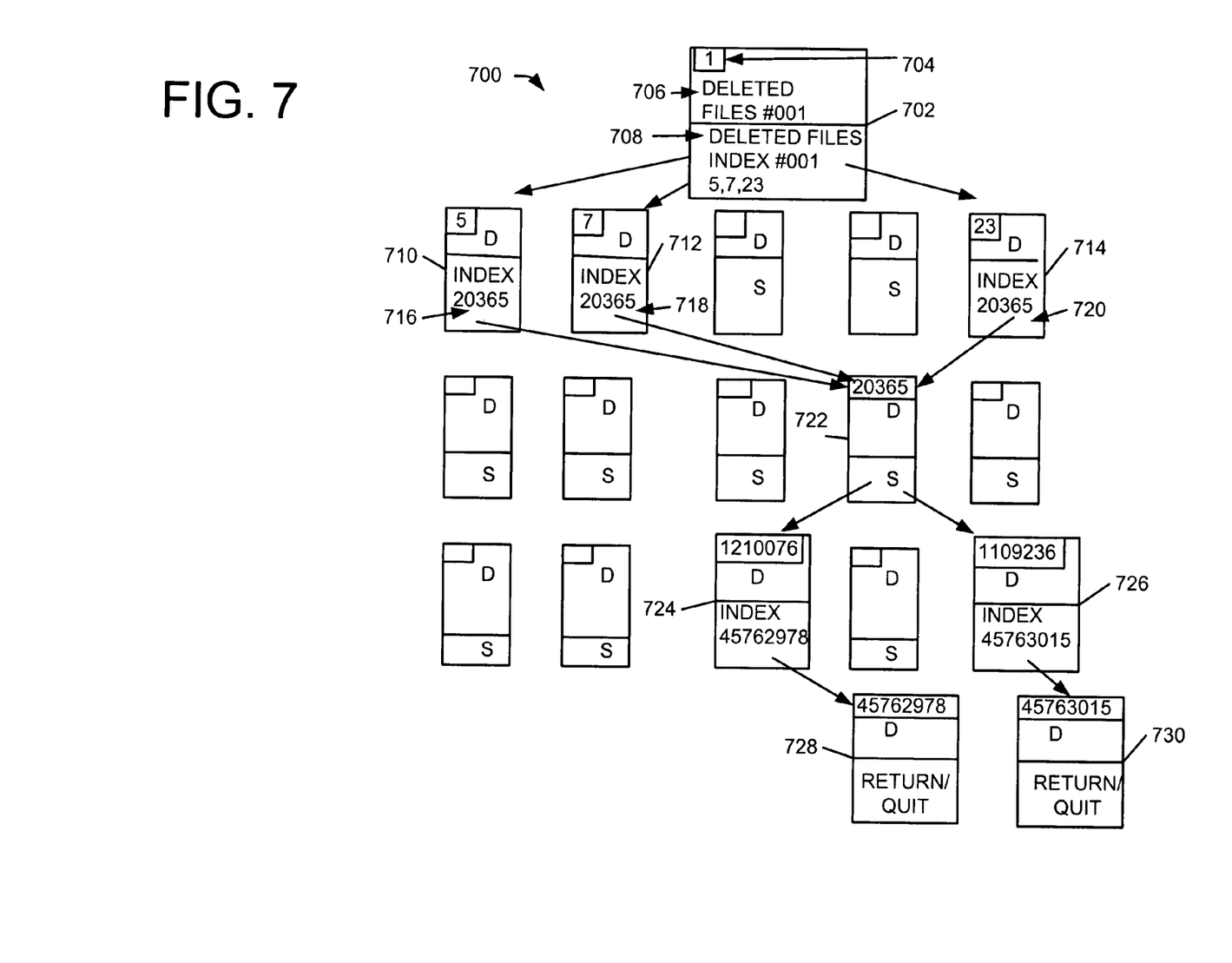
FIG. 7 is an illustrative example of a preferred embodiment of cycling through a deep database structure of a system for automatically facilitated customer support to obtain a response to user input.

The cycler module 304 effects cycling through the process shown in FIGS. 5-7 by gathering additional result detail until a satisfactory result is obtained. Intermediate and final result information is accumulated and/or stored in the result accumulator module 302. The cycler module 304 receives input from the input parser/filter module 308. The cycler module 304 queries the IDB 210 to obtain pertinent user records and associated information. Subsequently, the cycler module 304 checks the "state" in the state accumulator module 406. A state is includes summary and/or special information obtained from the DDB 212 in previous cycles, or obtained from the IDB 210, for the purpose of potentially aiding or modifying subsequent keyword matching/filtering. The cycler module 304 then selects the DDB indices/pages (shown in FIG. 4) to access via keyword matching between (a) the filtered input along with any "special state" information, if any, and (b) the information contained in the DDB page selector (shown in FIG. 4). Upon accessing the selected DDB pages, the cycler module 304 sends the pertinent information (e.g., data section) from these pages to the result accumulator module 302, retains the new selector information (e.g., selector section) and updates the "state" in the state accumulator module 306 as appropriate by for example adding the DDB indices of pages just accessed. In addition, the cycler module 304 either loops back to obtain additional user input or finishes by updating the user information in the IDB 210 with the cycle counter value (for example, indicating the depth/extent of the process just concluded) and the final resolution (for example, the list of pages/indices accessed to provide the final accumulated results).

The state accumulator module 306 stores intermediate status and result information that provides for keeping track of progress and for appropriately selecting the subsequent database accesses for each cycle of additional user input and database access/result determination. The state accumulator module 306 stores both the list of pages (via indices) accessed and any special state information. In an example, state information provides a mechanism for adding in or subtracting from the matching process for a specified keyword, in a circumstance where matching is not all or none but rather is by degree where the matching, for example, exceeds a pre-specified threshold in order to qualify as a match. In one preferred embodiment, the state accumulator module 306 provides a short-term memory that is utilized until the set of cycles associated with one user inquiry or problem is completed and the final accumulated results are presented to the user. At the conclusion of this set of cycles, the state is reset, or alternatively, the state is reset at the start of the next set of cycles.

The result accumulator module 302 stores intermediate results. The results of each cycle of additional user input and database access/result determination are added to the result accumulator module 302. At the end of the set of cycles associated with one user inquiry or problem, the result accumulator module 302 contains results for each cycle and makes these results available to the user's processing device 102 via the presentation module 204.

FIG. 4 is a block diagram of an illustrative example of a preferred embodiment of a deep database (DDB) structure 400 of a system for automatically facilitated customer support. The DDB structure 400 includes a plurality of database pages 402. The database page 402 includes a page index 404, a data section 406 and a selector selection 408. The database pages 402 may also be referred to as entries or forms. The page index 404 preferably includes an index number and a descriptive title. In a preferred embodiment, the page index 404 is utilized by the DDB structure 400 to retrieve the appropriate database page 402.

The data section 406 preferably includes the actual information and data accumulated and presented to the user regarding details of the identified vulnerability results. The selector section 408, preferably includes one or more independent lines of data, and up and down links to related database pages. In a preferred embodiment, the selector section 408 includes one or more index numbers as a database link to any related pages, and a matching field which contains a list of keywords, associated numeric ranges, etc., which can be used in the matching process to select subsequent pages to access. Thus in a preferred embodiment, each independent line of the selector section 408 contains one or more keywords plus one or more specific database page link indices with which these keywords are specifically associated and optional data such as related numeric ranges for alternative or advanced matching/filtering. In an alternative embodiment, the selector section 408 includes an empty or "null" downward-pointing indicator if the page is a "bottom page."

In the illustrative example shown in FIG. 4, a cycle typically begins at the top database page 402. In an example, the database page 402 contains mostly selector section information. The database pages at level 410 include selector section 408 information, however the amount of solution data in the data section 406 is increasing. At level 412, the database pages include less selector section 408 information and more solution data in the data section 406. At level 414, the database pages include more detailed solution data in the data section 406 and very little information in the selector section 408. Level 416 shows the bottom of the DDB structure for the illustrative example. Database page 420 includes a null section 422 indicating that this page is the bottom page. The bottom database page 420 does not include a downward pointing selector information and thus, a cycle stops at this page unless the cycle was previously stopped.

As shown in FIG. 4, the database pages are preferably organized in a hierarchical structure. For example, a cycle or search typically begins at DDB page 402. The selector section 408 of this page 402 provides links to a number of related pages. In an example, only one page, for example, DDB page 411 contains relevant information. Another cycle based on keywords identified in DDB page 411 uncovers links to the next level of DDB pages with DDB page 413 providing relevant information. Another cycle based on keywords identified in DDB page 413 reveals a link to DDB page 415. Another cycle based on keywords identified in DDB page 415 reveals a link to DDB page 420. In this example, DDB page 420 is the bottom page, as indicated by the null 422 reference, and thus no downward pointing selector information is available and the cycle ends.

FIG. 5 is a flowchart depicting general functionality (or method), in accordance with one preferred embodiment, of an implementation of automatically facilitated customer support. The process begins at 502. At 504, a user requests information to assist in solving computer problems such as a security and/or reliability related problem. The user can submit the request via numerous formats including email, web form, automatically generated files such as firewall or intrusion detection system logs, electronic interactive form input filled out by a customer representative talking with a customer, input in response to prompting from a presentation module, among others. In a preferred embodiment, the user's request for information is converted into data usable by a cycler module. At 506, the cycler module (or other searching device) cycles through databases, such as the databases of a deep database structure to obtain a reply to the user's request for information. At 508, the user determines if the reply sufficiently answers the question or request for information. If the question is not answered, at 510, a user has the option to ask another question or provide additional details regarding the problem, possibly guided by the reply provided to this point. If the user chooses to ask another question or to provide additional details, the process continues at 504 with the user requesting information or providing further details of the problem associated with the question. If the user does not choose to ask another question or provide additional detail, the process ends at 512. If the question is answered, at 514, the user has the option to ask another question. If the user chooses to ask another question, the process continues at 504 with the user requesting information. If the user does not choose to ask another question, the process ends at 512.

FIGS. 6A and 6B are flowcharts depicting more specific functionality (or methods), in accordance with one preferred embodiment, of an implementation of automatically facilitated customer support. The process begins at 600. At 602, the user (or customer) is selected or assigned in order to identify the user so that the appropriate set of information contained in the IDB (which may contain information associated with many different users) can be appropriately selected and accessed. The cycle counter is set to 1. At 604, user input is requested. In a preferred embodiment, a user processing device configured to interact with a presentation module is utilized to query the user. At 605, policy input is received by the IDB, among other data sources. At 606, the user input is received. User input can be received via a plurality of mechanisms, including input received directly from the user, email, web page form, or pager, or a combination of these inputs, among others. At 608, the type of input is identified. For instance, the input is identified as being manual, web form, log file, email, or a combination of these types of input, among others. At 610, the input is parsed and/or filtered such that only potentially useful information remains. At 612, in a preferred embodiment, a cycler module receives the filtered input. Preferably, the filtered input is provided in a format that is suitable for matching with data selector information of a database page of a deep database (DDB) structure. At 614, the cycler module queries the index database (IDB) to obtain user records (or profile) information. At 616, the cycler module checks for any "states" via the state accumulator module. The state encompasses summary and/or special information obtained from the DDB structure in previous cycles, or obtained from the IDB, for the purpose of potentially aiding or modifying subsequent keyword matching/filtering. At 618, the cycler module selects the DDB indices and/or pages to access utilizing the matching of the filtered input and state information against the DDB page selector information. In a preferred embodiment, the cycler module begins at a top page of the DDB structure on the first cycle. A portion of each DDB page includes selector information that is matched against the next cycle. In a preferred embodiment, the cycler module performs matching to determine the next DDB page or pages to access by performing a matching between (a) the filtered input plus any special state information, if any, and (b) the information contained in the DDB page selector from the last DDB page or pages are accessed. In one preferred embodiment, these matches consist of whether keywords are present or not in both the filtered input and the currently-held page selector information. If simultaneously present, there is a match, and the associated page index or indices within that line of the page selector information provides the identification of subsequent pages to be accessed. In an alternative preferred embodiment, a more complex match "by degree" is also possible, utilizing "special state" information in the form of positive or negative numerical values which are combined with numerical values assigned to certain keywords to determine whether pre-set thresholds are exceeded. If exceeded, then there is a match, and the associated page index or indices within that line of the page selector information provide the identification of subsequent pages to be accessed. The special state information, assigned keyword numerical values, and the pre-set thresholds can be part of the data or selector areas on any DDB page. If this information is encountered it is held in the state accumulator module until it is reset at the beginning of the next inquiry (set of cycles). When the special state information occurs in an early cycle, this causes an increased or decreased sensitivity to the occurrence of specified keywords which may be encountered in later cycles (within the same set of cycles), and provides additional flexibility in the matching process. In some embodiments, this is used to reflect cases where associations between input and results are of a probabilistic nature or imply a tendency towards something and are not one-to-one associations).

In an alternative preferred embodiment, the special state information could be arranged to be "multiplicative" or "divisional" (or any other suitable mathematical process) in addition to, or rather than, being "additive" or "subtractive," in which case the default keyword numerical value would be multiplied or divided by the "special state" numerical values before being applied to the threshold test. A single match can occur, or multiple matches can occur at the same step (cycle) of the process, where multiple matches represent the occurrence of multiple simultaneous conditions. The process continues on FIG. 6B.

Referring to FIG. 6B, at 620, the cycler module accesses the DDB selected pages and sends the results to a result accumulator module. At 622, the cycler module updates the state information in the state accumulator module with DDB indices of pages just accessed. At 624, a determination is made as to whether more cycles are needed to satisfy the customer's input request. In a preferred embodiment, the determination is made by a user who decides that more cycles are needed to obtain requested information. In an alternative preferred embodiment, the cycler module knowing that it has not yet reached the bottom DDB page makes the determination. If more cycles are needed, the cycle counter is incremented by one and preferably the process continues at 604 with the user providing additional input for each new cycle. Preferably, the state is accumulated as the cycles continue, and the process ends when the user is satisfied by selecting "finished" or provides a "no further cycles" notification. In an alternative preferred embodiment, the process ends when the cycling has occurred down to the bottom of the DDB structure, in which case the selector information contains no further possible page look-ups. If no more cycles are needed, at 626, the cycler module updates the IDB with customer information. Customer information can include, but is not limited to, cycle counter value and problem resolution data. The process ends at 628.

FIG. 7 is an illustrative example of a preferred embodiment of cycling through a deep database structure of a system for automatically facilitated customer support to obtain a response to user input. In an example, the user requests help regarding a security problem involving a virus. In one preferred embodiment, the user (or customer) utilizes the implementation as shown in FIGS. 6A and 6B. Typically, the process begins at the top level of the DDB structure 700 and gathers more detailed information with each cycle, gradually traversing down through lower levels of the DDB structure 700 as the user is repeatedly prompted for pertinent input. The DDB structure 700 includes a configuration that includes a plurality of DDB pages, such as DDB page 702. Using DDB page 702 as an example, each DDB page includes a page index 704, a data section 706 and a selector section 708. Any pointers and keywords shown in FIG. 7 are for illustrative purposes and during implementation, the prompts and keywords would be chosen and arranged by subject matter experts and experts in user interaction for effective cycling of the DDB structure 700.

In a preferred embodiment, initialization begins with any state previously stored in the state accumulator module 306 being reset (i.e., erased). The user is identified such that the IDB 210 is accessed to retrieve the pertinent user records. User records can include known configuration information, for instance, the user's operating system, software applications installed or used, level of help service purchased, etc. This information, or a subset of it, is stored in the state accumulator module 306 for reference. The cycle counter is reset to equal "1" which represents the first cycle.

In an example, DDB page 702, is the first page of the DDB structure 700 with a page index=1 (704) and is the "current" page 702. The current page is arranged to list a number of symptoms that are presented to the user. In an illustrative example, page 702 includes the symptom, "files have been disappeared even though they have not been purposely deleted." The user selects this problem. If any extraneous input is provided by the user, the input parser/filter module 308 removes it. Associated with this chosen symptom is the keyword "Deleted_Files #001," which is provided by the input parser/filter module 308 to the cycler module 304. The cycler module 304 examines the selector section 708 of the current page 702 (i.e., the top page) and detects that "Deleted Files #001 Index 5, 7, 23" is present as one of the lines of the selector information, indicating that pages 5, 7, and 23 should be accessed. The cycle counter is incremented to "2."

DDB pages 5, 7, and 23 (710, 712 and 714, respectively) are accessed. Data section portions of each page 710, 712 and 714 are provided to the result accumulator module 302.

The result accumulator module 302 stores the information from the data sections and provides the included prompt (also referred to as a pointer) related information, informative text and graphics to the user via the presentation module 304. Pages 5, 7, and 23 (710, 712 and 714) become the "current" pages. Upon reviewing the information, the user determines that pages 5 and 7 do not apply but page 23 does apply. The prompt from page 23 asks the user if he has anti-virus software available, and if so, what kind, and what were the results from using the anti-virus software, for instance, did the software detect a specific virus by name. The user has anti-virus software available, which indicated that the user has a specific virus. The user provides the appropriate input, including the virus name "JavascriptDream04W." Keywords associated with these inputs (e.g., Antivirus=Yes, Norton_Version2000, and JavascriptDream04W) are provided to the cycler module 304, which looks for matches within the selector sections 716, 718 and 720 of pages 5, 7, and 23 (710, 712 and 714). A match is found which includes all three keywords. The index for the match is "Index 20365," indicating that page 20365 should be accessed to obtain information on this particular virus. In an alternative preferred embodiment, if the user had anti-virus software but did not have a virus identified by name, keywords resulting from responses to the prompts would direct the cycler module 304 to access pages which would lead the user through the steps needed to obtain the virus name, or other associated details, for the user's specific anti-virus software. Indices 5, 7, and 23 are stored as "state" in the state accumulator module 406. The cycle counter is incremented and now it equals 3.

The three current pages are pages 5, 7, and 23. The user decides that only the information obtained from page 23 is pertinent. In alternative examples involving multiple current pages, a user may find pertinent information originating from all or some subset of those current pages.

The index from page 23 (714) is 20365. The user selects page 23, causing the cycler module 304 to access page 20365 (722) and provide its data section to the result accumulator module 302. The presentation module 204 provides prompts and informative text and graphics to the user regarding information on page 20365 (722). A number of necessary questions are asked regarding the type of files lost. Likewise, other questions are asked for example, other pertinent software applications that may be installed. If such information is already in user information retrieved previously, and available in the state accumulator module 306, then certain questions regarding installed software questions are not asked or are asked in slightly different form (e.g., merely to verify rather than obtain additional needed details, such as the software version number). The user answers the questions, enabling the associated keywords to be provided to the cycler module 304, which finds a selector area line containing index references to pages 1109236 and 1210076 (726 and 724). Index 20365 is added to the state stored along with the previously stored information in the state accumulator module 306. The cycle counter is incremented to 4.

Pages 1109236 and 1210076 (726, 724) are accessed. Information from page 1109236 (726) leads the user through a set of actions to search for and delete certain files installed by the virus. Information from page 1210076 (724) leads the user through a set of actions to search for and remove a number of items added to the Windows™ registry. Prompts are presented to the user to indicate the completion of these actions and the results. When the user responds to the prompts, keywords are provided to the cycler module 304, which finds a line in the selector section of each page, one line including "Index 45762978" and the other including "Index 45763015." Indices 1109236 and 1210076 are added to the state of the result accumulator module 302. The cycle counter is incremented to 5.

In this example, the cycler module 304 searched selector areas in two current pages for keyword matches, and found matches in both. In alternative examples, the cycler module 304 may find matches on only one of a number of current pages. In another example, the cycler module 304 may not find a match. In this case a default match occurs via the last line of each selector area. For instance, a "return to higher level" entry with an index may be provided such that the system safely returns to a point where the user could be prompted for further input that subsequently would allow the system to continue to process. In some examples, the "return to higher level" entry occurs repeatedly due to for instance, repeated lack of matches, until the user returns to all the way back up to the top page, which by default would have an "exit" option (e.g., page 0 (not shown), to cause the system to return to its start-up condition). In addition, every page preferably includes an "exit" option as the second to last entry in the selector section, so that the user is always afforded the option to exit regardless of where the user is in the process.

The user accesses pages 45762978 and 45763015 (728, 730) and information from these pages is presented to the user. Page 45762978 (728) provides useful conclusions and information regarding the service or process just completed. Page 45762978 (728) may include information such as thanking the user for using the service, and request that the user to determine whether they wish to make another inquiry or quit. Page 45763015 (730) may provide the user with the ads and related service offerings, including for instance, time-sensitive offers. The user elects to quit. The cycle counter is incremented to 6.

In an alternative preferred embodiment where the user quits the system, the accumulated state could be erased from the state accumulator module 306 at this point rather than left intact to be erased at the next initialization occurrence. If the user chose not to quit, the system would be returned to initialization step except that the user's records would not have to be pulled from the IDB 210 since that information is already present. Pages 45762978 and 45763015 (728, 730) are both "bottom" pages, in that they include no selector section information other than the "return to higher level" and/or "quit" entries, i.e. they contain no other lines of keywords with associated index values (other than these last two default lines for "return" and "quit"). Thus pages 728, 730 include null selectors, and cannot be utilized to delve to any deeper level of the DDB structure 700 since no deeper level of the DDB structure 700 exists for this example inquiry.

When the user elects to quit, the system returns to page 0 (not shown) the system's start-up state, in which the system is ready to begin the process at the initialization step. All accumulated results are saved to the IDB 210 for this user. Preferably the IDB 210 also saves associated helpful information such as record keeping information, billing information, or information useful for future inquiries (e.g., the number of levels or pages accessed, the cycle counter value which equals the number of cycles which occurred, the amount of time transpired, etc.).

In an alternative preferred embodiment, the information saved in the IDB 210 is saved at the conclusion of a previous step rather than at the inquiry conclusion. Interim saving of information is useful to, for example, improve operating efficiency, performance, or reliability when a user performs multiple back-to-back inquiries. In addition, interim saving of information is particularly helpful in the event of an unexpected malfunction or power loss.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for providing users access to information to assist in resolving problems with electronic services, comprising:
   receiving input regarding a particular symptom;
   determining a first keyword based on the received input;
   accessing an index database to obtain information associated with a user;
   accessing a deep database structure configured as hierarchical database pages, at least a portion of the database pages including information regarding symptoms and associated keywords;
   cycling through the deep database structure to obtain a first database page having at least one keyword that matches the first keyword, the first database page including a plurality of page indexes associated with a second database page of the deep database structure and including at least one prompt for additional information, wherein the second database page is different from the first database page;
   providing information regarding symptoms associated with the first database page;
   providing the at least one prompt from the first database page;
   determining a second keyword based on an association between the at least one prompt and the additional information received in response to the at least one prompt, wherein the second keyword is different from the first keyword;
   accessing the second database page of the deep database structure that corresponds to at least one page index of the plurality of page indexes included in the first database page and that is associated with the second keyword; and
   providing information regarding symptoms associated with the second database page.

2. The method of claim 1, further comprising incrementing a cycle counter.

3. The method of claim 1, further comprising resetting a state accumulator module.

4. The method of claim 1, further comprising storing any intermediate search results in a result accumulator module.

5. The method of claim 1, further comprising saving the information regarding symptoms from data sections of the first database page and from the second database page in a result accumulator module.

6. The method of claim 1, further comprising providing keyword information from database pages matching keywords determined from input to a presentation module.

7. The method of claim 6, further comprising providing at least one of prompt information, informative text or graphical information to a user's processing device utilizing the presentation module.

8. The method of claim 1, further comprising filtering the input to remove extraneous input.

9. The method of claim 1, wherein the information regarding symptoms associated with the second database page includes more detailed information in comparison to the information regarding symptoms associated with the first database page.

10. The method of claim 1, further comprising receiving user input by a cycler module as necessary to continue cycling through the deep database structure.

11. The method of claim 1, further comprising storing page indexes of database pages that match keywords in a state accumulator module.

12. The method of claim 1, further comprising continuing to cycle through the deep database structure until encountering an indication that no other lines of keywords exist for the keyword under examination.

13. The method of claim 1, further comprising continuing to cycle through the deep database structure until receiving an exit command from a user.

14. The method of claim 1, further comprising continuing to cycle through the deep database structure until encountering a null selector in a database page.

15. The method of claim 1, further comprising obtaining additional information from the user during each cycle through the deep database structure, and presenting intermediate information to the user during each cycle through the deep database structure, wherein the user is guided to provide additional information such that the user is guided through a plurality of cycles.

16. A method for providing users access to information to assist with resolving questions on electronic security services, comprising:
   detecting a request for information from a user;
   accessing a database to obtain information associated with the user;
   accessing a first database page configured to include a list of symptoms and keywords for a plurality of subjects;
   detecting a selection of a first keyword associated with a particular symptom;
   cycling through database pages configured as a hierarchy to obtain a second database page including at least one keyword that matches the first keyword, the second database page including a plurality of page indexes associated with further database pages and including at least one prompt for additional information, wherein the second database page is different from the first database page;
   providing results associated with the second database page to the user utilizing a presentation module;
   providing the at least one prompt from the second database page;
   determining a second keyword based on an association between the at least one prompt and the additional information received in response to the at least one prompt, wherein the second keyword is different from the first keyword;
   accessing at least one of the further database pages that corresponds to at least one of the plurality of page indexes included in the second database page and that is associated with the second keyword;
   providing results associated with the at least one of the further database pages to the user utilizing the presentation module; and
   continuing to cycle through the database pages until receiving notification that a last database page has been reached.

17. The method claim 16, further comprising incrementing a cycler counter.

18. The method of claim 17, further comprising providing information on accessed database pages to a result accumulator module.

19. The method of claim 18, further comprising filtering information provided along with the selection of the first keyword to remove any extraneous information.

20. The method of claim 19, further comprising storing page indexes for database pages that match keywords in a state accumulator module.

21. The method of claim 20, further comprising returning the database and database pages to a startup state.

22. The method of claim 21, further comprising storing accumulated results of the cycling in the database for the user.

23. A computer-readable storage medium comprising:
   logic configured to receive input regarding a particular symptom;
   logic configured to determine a first keyword based on the received input;
   logic configured to access a database structure including database pages, at least a portion of the database pages including information regarding symptoms and associated keywords;
   logic configured to cycle through the database structure configured as a hierarchy to obtain a first database page having at least one keyword that matches the first keyword, the first database page including a plurality of page indexes associated with a second database page of the database structure and including at least one prompt for additional information, wherein the second database page is different from the first database page;
   logic configured to provide information regarding symptoms associated with the first database page;
   logic configured to provide the at least one prompt from the first database page;
   logic configured to determine a second keyword based on an association between the at least one prompt and the additional information received in response to the at least one prompt, wherein the second keyword is different from the first keyword;
   logic configured to access the second database page of the database structure that corresponds to at least one page index of the plurality of page indexes included in the first database page and that is associated with the second keyword; and
   logic configured to provide information regarding symptoms associated with the second database page.

24. The computer-readable storage medium of claim 23, further comprising logic configured to access an index database to obtain information associated with a user.

25. A computer readable storage medium, comprising:
- an index database (IDB) configured to include information associated with a user;
- a deep database (DDB) structure configured to include database pages, at least a portion of the database pages having a data section including information regarding symptoms and a selector section including associated keywords;
- a cycler module configured to:
  - access the index database to obtain the information associated with the user,
  - cycle through the deep database structure configured as a hierarchy to obtain a first database page having at least one keyword that matches a first keyword associated with input provided by a user, the first database page including a plurality of page indexes associated with a second database page of the deep database structure and including at least one prompt for additional information, wherein the second database page is different from the first database page,
  - provide the at least one prompt from the first database page,
  - determine a second keyword based on an association between the at least one prompt and the additional information received in response to the at least one prompt, wherein the second keyword is different from the first keyword, and
  - access the second database page of the deep database structure that corresponds to at least one page index of the plurality of page indexes included in the first database page and that is associated with the second keyword; and
- a presentation module configured to provide information regarding symptoms associated with the first database page, and the second database page.

26. The computer readable storage medium of claim 25, further comprising a parser for parsing and filtering the user input.

27. The computer readable storage medium of claim 25 further comprising a result accumulator module operatively coupled to the cycler module for storing intermediate results obtained by the cycler module.

28. The computer readable storage medium of claim 27, wherein the presentation module is operatively coupled to the parser, the result accumulator module and a user's processing device, the presentation module further configured to format and present results from the result accumulator module to the user's processing device.

29. The computer readable storage medium of claim 25, further comprising a state accumulator module operatively coupled to the cycler module, the state accumulator module configured to store intermediate status and result information resulting from each search performed by the cycler module.

30. The computer readable storage medium of claim 29, wherein the cycler module is further configured to utilize accumulated state information in the state accumulator module to modify the matching and filtering of keywords such that a probability of matching and filtering keywords is changed based upon pre-determined success factors.

31. The computer readable storage medium of claim 25, further comprising a database interface module operatively coupled between the cycler module and the IDB and the DDB structure, the database interface module configured to enable provisioning and access to the IDB and the DDB structure by the cycler module.

* * * * *